US 7,181,757 B1

(12) United States Patent
Kim et al.

(10) Patent No.: US 7,181,757 B1
(45) Date of Patent: Feb. 20, 2007

(54) VIDEO SUMMARY DESCRIPTION SCHEME AND METHOD AND SYSTEM OF VIDEO SUMMARY DESCRIPTION DATA GENERATION FOR EFFICIENT OVERVIEW AND BROWSING

(75) Inventors: Jae Gon Kim, Taejon (KR); Hyun Sung Chang, Taejon (KR); Munchurl Kim, Taejon (KR); Jin Woong Kim, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 854 days.

(21) Appl. No.: 09/675,984

(22) Filed: Sep. 29, 2000

(30) Foreign Application Priority Data

Oct. 11, 1999 (KR) ............................... 1999-43712
Sep. 22, 2000 (KR) ............................... 2000-55781

(51) Int. Cl.
*H04N 5/445* (2006.01)
(52) U.S. Cl. .............................. 725/61; 725/40; 725/46
(58) Field of Classification Search .................. 725/40, 725/46, 61, 25, 35, 38; 345/716, 719, 720, 345/723; 348/563, 564
See application file for complete search history.

(56) References Cited

U.S. PATENT DOCUMENTS

| 5,821,945 | A | * | 10/1998 | Yeo et al. | ..................... 345/440 |
| 5,956,026 | A | | 9/1999 | Ratakonda | ................... 345/328 |
| 5,963,203 | A | * | 10/1999 | Goldberg et al. | ............ 345/723 |
| 5,995,095 | A | * | 11/1999 | Ratakonda | ................ 715/500.1 |
| 6,236,395 | B1 | * | 5/2001 | Sezan et al. | ................. 345/723 |
| 6,573,904 | B1 | * | 6/2003 | Chun et al. | ................... 345/719 |
| 6,601,026 | B2 | * | 7/2003 | Appelt et al. | .................. 704/9 |
| 6,961,954 | B1 | * | 11/2005 | Maybury et al. | .............. 725/53 |

FOREIGN PATENT DOCUMENTS

| EP | 0 938 054 A2 | 8/1999 |
| JP | 9-219835 | 8/1997 |
| JP | 11/69281 | 3/1999 |
| WO | WO 99/41684 | 8/1999 |

OTHER PUBLICATIONS

ISO/IEC JTC1/SC29/WG11, "MPEG-7 Description Schemes (V0. 5)," *Description Scheme Group*, pp. 1-58, Jul. 1999.

(Continued)

*Primary Examiner*—Kieu-Oanh Bui
(74) *Attorney, Agent, or Firm*—Seed IP Law Group PLLC

(57) ABSTRACT

A video summary description system for describing video summary by meta data to provide overview functionality that makes it feasible to understand the overall contents of the original video within a short time with navigation and browsing functionalities, and that makes it feasible to search the desired video contents efficiently. The system includes a HierarchicalSummary Description Scheme (DS) for describing a video summary that includes a HighlightLevel DS having at least one HighlightSegment DS. The HighlightSegment DS describes information on a highlight segment corresponding to one of the video summary intervals, and the HighlightSegment DS includes a VideoSegmentLocator DS for describing time information or the video itself of the highlight segment and an ImageLocator DS describing a representative frame of the highlight segment.

43 Claims, 4 Drawing Sheets

OTHER PUBLICATIONS

Kim, M., et al., "An Extended Summary DS for Navigation and Browsing," *Electronics and Telecommunications Research Institute (ETRI)*, 7 pages, Oct. 1999.

Kim, J-G., et al., "Summary Description Schemes for Efficient Video Navigation and Browsing," *Proceedings of SPIE vol.* 4067:1397-1408, 2000.

Smith, M., et al., "Video Skimming and Characterization Through the Combination of Image and Language Understanding Techniques," in *Proceedings of the IEEE Computer Vision and Pattern Recognition (CVPR) Conference*, San Juan, PR, 1997, 7 pages.

Zhang, H., et al., "Content-Based Video Browsing Tools," in *Proceedings of the SPIE, vol.* 2417, Bellingham, VA, Feb. 6, 1995, pp. 389-398.

Zhang, H., et al., "Structured and Content-Based Video Browsing," *Conference Record of the Thirty-Second Asilomar Conference on Signals, Systems & Computer*, Pacific Grove, CA, Nov. 1-4, 1998, pp. 910-914.

* cited by examiner

VIDEO SUMMARY DESCRIPTION SCHEME
AND METHOD AND SYSTEM OF VIDEO
SUMMARY DESCRIPTION DATA
GENERATION FOR EFFICIENT OVERVIEW
AND BROWSING

TECHNICAL FIELD

The present invention relates to a video summary description scheme for efficient video overview and browsing, and also relates to a method and system of video summary description generation to describe video summary according to the video summary description scheme.

The technical fields in which the present invention is involved are content-based video indexing and browsing/searching and summarizing video to the content and then describing it.

BACKGROUND OF THE INVENTION

The format of summarizing video largely falls into dynamic summary and static summary. The video description scheme according to the embodiments of the present invention is for efficiently describing the dynamic summary and the static summary in the unification-based description scheme.

Generally, because the existing video summary and description scheme provide simply the information of video interval which is included in the video summary, the existing video summary and description scheme are limited to conveying overall video contents through the playing of the video summary.

However, in many cases, the browsing for identifying and revisiting concerned parts through overview of overall contents is needed rather than only overview of overall contents through the video summary.

Also, the existing video summary provides only the video interval which is considered to be important according to the criteria determined by the video summary provider. Accordingly, if the criteria of users and the video provider are different from each other or users have special criteria, the users cannot obtain the video summary they desire.

That is, although the existing video summary permits the users selecting the video summary with a desired level by providing several levels' video summary, it makes the selecting extent of the users limited so that the users cannot select by the contents of the video summary.

The U.S. Pat. No. 5,821,945 entitled "Method and apparatus for video browsing based on content and structure" represents video in compact form and provides browsing functionality accessing to the video with desired content through the representation.

However, the patent pertains to static summary based on the representative frame, and although the existing static summary summarizes by using the representative frame of the video shot, the representative frame of this patent provides only visual information representing the shot. The patent has a limitation on conveying the information using the summary scheme.

As compared with the patent, the video description scheme and browsing method of the embodiments described herein utilize the dynamic summary based on the video segment.

The video summary description scheme was proposed by the MPEG-7 Description Scheme (V0.5) announced ISO/IEC JTC1/SC29/WG11 MPEG-7 Output Document No. N2844 on July 1999. Because the scheme describes the interval information of each video segment of dynamic video summary, in spite of providing basic functionalities describing dynamic summary, the scheme has problems in the following aspects.

First, there is the drawback that it cannot provide access to the original video from summary segments constituting the video summary. That is, when users want to access the original video to understand more detailed information on the basis of the summary contents and overview through video summary, the existing scheme cannot meet the need.

Secondly, the existing scheme cannot provide sufficient audio summary description functionalities.

And finally, there is the drawback that in the case of representing event-based summary, the duplicate description and the complexity of searching is indispensable.

SUMMARY OF THE INVENTION

The disclosed embodiments of the present invention provide a hierarchical video summary description scheme, which comprises the representative frame information and the representative sound information at each video interval that is included in the video summary and makes feasible the user-customized event-based summary providing the users' selection for the contents of the video summary and efficient browsing, and a video summary description data generation method and system using the description scheme.

In order to achieve the foregoing, the HierarchicalSummary DS according to an executable example of the present invention comprises at least one HighlightLevel DS, which is describing highlight level, and the HighlightLevel DS comprises at least a HighlightSegment DS, which is describing highlight segment information constituting the video summary of the highlight level.

Preferably, the HighlightLevel DS is composed of at least one lower level HighlightLevel DS's.

More preferably, the HighlightSegment DS comprises a VideoSegmentLocator DS, which is describing time information or video itself of the corresponding highlight segment.

It is preferable that the HighlightSegment DS further comprises ImageLocator DS, which is describing the representative frame of the corresponding highlight segment.

It is more preferable that the HighlightSegment DS further comprises SoundLocator DS, which is describing the representative sound information of said corresponding highlight segment.

Preferably, the HighlightSegment DS further comprises ImageLocator DS, which is describing the representative frame of the corresponding highlight segment, and SoundLocator DS, which is describing the representative sound information of the corresponding highlight segment.

More preferably, the ImageLocator DS describes time information or image data of the representative frame of video interval corresponding to the corresponding highlight segment.

Preferably, the HighlightSegment DS further comprises AudioSegmentLocator DS, which is describing the audio segment information constituting an audio summary of the corresponding highlight segment.

More preferably, the AudioSegmentLocator DS describes time information or audio data of the audio interval of the corresponding highlight segment.

It is preferable that the HierarchicalSummary DS include SummaryComponentList describing and enumerating all of the SummaryComponentTypes that is included in the HierarchicalSummary DS.

Also, it is preferable that the HierarchicalSummary DS include SummaryThemeList DS, which is enumerating the event or subject comprised in the summary and describing the ID and then describes event based summary and permits the users to browse the video summary by the event or subject described in the SummaryThemeList.

It is more preferable that the SummaryThemeList DS include an arbitrary number of SummaryThemes as elements and the SummaryTheme includes an attribute of id representing the corresponding event or subject, and the SummaryTheme further includes an attribute of parentID which is to describe the id of the event or subject of the upper level.

Preferably, the HighlightLevel DS includes an attribute of themeIds describing the attribute of ids of common events or subjects if all of the HighlightSegments and HighlightLevels which are constituting the corresponding highlight level have common events or subjects.

More preferably, the HighlightSegment DS includes an attribute of themeIds describing the attribute of id and describes the event or subject of the corresponding highlight segment.

Also, according to the present invention, a computer-readable recording medium where a HierarchicalSummary DS is stored therein is provided. Preferably, the HierarchicalSummary DS comprises at least one HighlightLevel DS, which is describing the highlight level, and the HighlightLevel DS comprises at least one HighlightSegment DS, which is describing highlight segment information constituting the video summary of that the highlight level, and the HighlightSegment DS comprises VideoSegmentLocator DS describing time information or video itself of the corresponding highlight segment.

Also, according to the embodiments of the present invention, a method for generating video summary description data according to video summary description scheme by inputting original video is provided. The method includes the following steps: a video analyzing step, which is producing video analysis result by inputting the original video and then analyzing the original video; a summary rule defining step, which is defining the summary rule for selecting video summary interval; a video summary interval selecting step, which constitutes video summary interval information by selecting the video interval capable of summarizing video contents from the original video by inputting the original video analysis result and the summary rule; and a video summary describing step, which is producing video summary description data according to the HierarchicalSummary DS by inputting the video summary interval information output by the video summary interval selecting step.

Preferably, the video analyzing step comprises a feature extracting step, which is outputting the types of features and video time interval at which those features are detected by inputting the original video and extracting those features, an event detecting step, which is detecting key events included in the original video by inputting the types of features and video time interval at which those features are detected; and an episode detecting step, which is detecting an episode by dividing the original video into a story flow base on the basis of the detected event.

Preferably, the summary rule defining step provides the types of summary events, which are bases in selecting the video summary interval, after defining them to the video summary describing step.

More preferably, the method further comprises a representative frame extracting step, which is providing the representative frame to the video summary describing step by inputting the video summary interval information and extracting representative frame.

More preferably, the method further comprises a representative sound extracting step, which is providing the representative sound to the video summary describing step by inputting the video summary interval information and extracting representative sound.

Also, according to the embodiments of the present invention, a computer-readable recording medium where a program is stored therein is provided. The program executes the following steps: a feature extracting step, which is outputting the types of features and video time interval at which those features are detected; an event detecting step, which is detecting key events included in the original video by inputting the types of features and the video time interval at which those features are detected; an episode detecting step, which is detecting an episode by dividing the original video into a story flow base on the basis of the detected key events; a summary rule defining step, which is defining the summary rule for selecting the video summary interval; a video summary interval selecting step, which is constituting a video summary interval information by selecting the video interval capable of summarizing the video contents of the original video by inputting the detected episode and the summary rule; and a video summary describing step, which is generating video summary description data with HierarchicalSummary DS by inputting the video summary interval information output by the video summary interval selecting step.

Also, according to the present invention, a system for generating video summary description data according to video summary description scheme by inputting original video is provided. The system includes video analyzing means for outputting a video analysis result by inputting original video and analyzing the original video, summary rule defining means for defining the summary rule for selecting the video summary interval, video summary interval selecting means for constituting video summary interval information by selecting the video interval capable of summarizing the video contents of the original video by inputting the video analysis result and the summary rule, and video summary describing means for generating video summary description data with HierarchicalSummary DS by inputting the video summary interval information output by the video summary interval selecting means.

Preferably, the HierarchicalSummary DS comprises at least one HighlightLevel DS, which is describing highlight level, the HighlightLevel DS comprises at least one HighlightSegment DS, which is describing highlight segment information constituting the video summary of the highlight level, and the HighlightSegment DS comprises VideoSegmentLocator DS describing time information or the video itself of the corresponding highlight segment.

Preferably, the video analyzing means comprises feature extracting means for outputting the types of features and video time interval at which those features are detected by inputting the original video and extracting those features, event detecting means for detecting key events included in the original video by inputting the types of features and video time interval at which those features are detected; and episode detecting means for detecting episode by dividing the original video into story flow base oh the basis of the detected event.

More preferably, the summary rule defining means provides the types of summary events, which are bases in selecting the video summary interval, after defining them to the video summary describing means.

It is preferable that the system further comprise representative frame extracting means for providing the representative frame to the video summary describing means by inputting the video summary interval information and extracting representative frame.

It is more preferable that the system further comprise representative sound extracting means for providing the representative sound to the video summary describing means by inputting the video summary interval information and extracting representative sound.

Also, according to the embodiments of the present invention, a computer-readable recording medium where a program is stored therein is provided. The program is for functioning feature extracting means for outputting the types of features and video time interval at which those features are detected, event detecting means for detecting key events included in the original video by inputting the types of features and the video time interval at which those features are detected, episode detecting means for detecting episode by dividing the original video into story flow base on the basis of the detected key events, summary rule defining means for defining the summary rule for selecting the video summary interval, video summary interval selecting means for constituting video summary interval information by selecting the video interval capable of summarizing the video contents of the original video by inputting the detected episode and the summary rule, and video summary describing means for generating video summary description data with HierarchicalSummary DS by inputting the video summary interval information output by the video summary interval selecting step.

Also, a Video browsing system in a server/client circumstance according to the present invention is provided. The system includes a server that is equipped with video summary description data generation system which generates video summary description data on the basis of HierarchicalSummary DS by inputting original video and links the original video and video summary description data, and a client that is browsing and navigating video by overview of the original video and access to the original video of the server using the video summary description data.

BRIEF DESCRIPTION OF THE DRAWINGS

The embodiments of the present invention will be explained with reference to the accompanying drawings, in which.

DETAILED DESCRIPTION OF THE INVENTION

Figure 1:
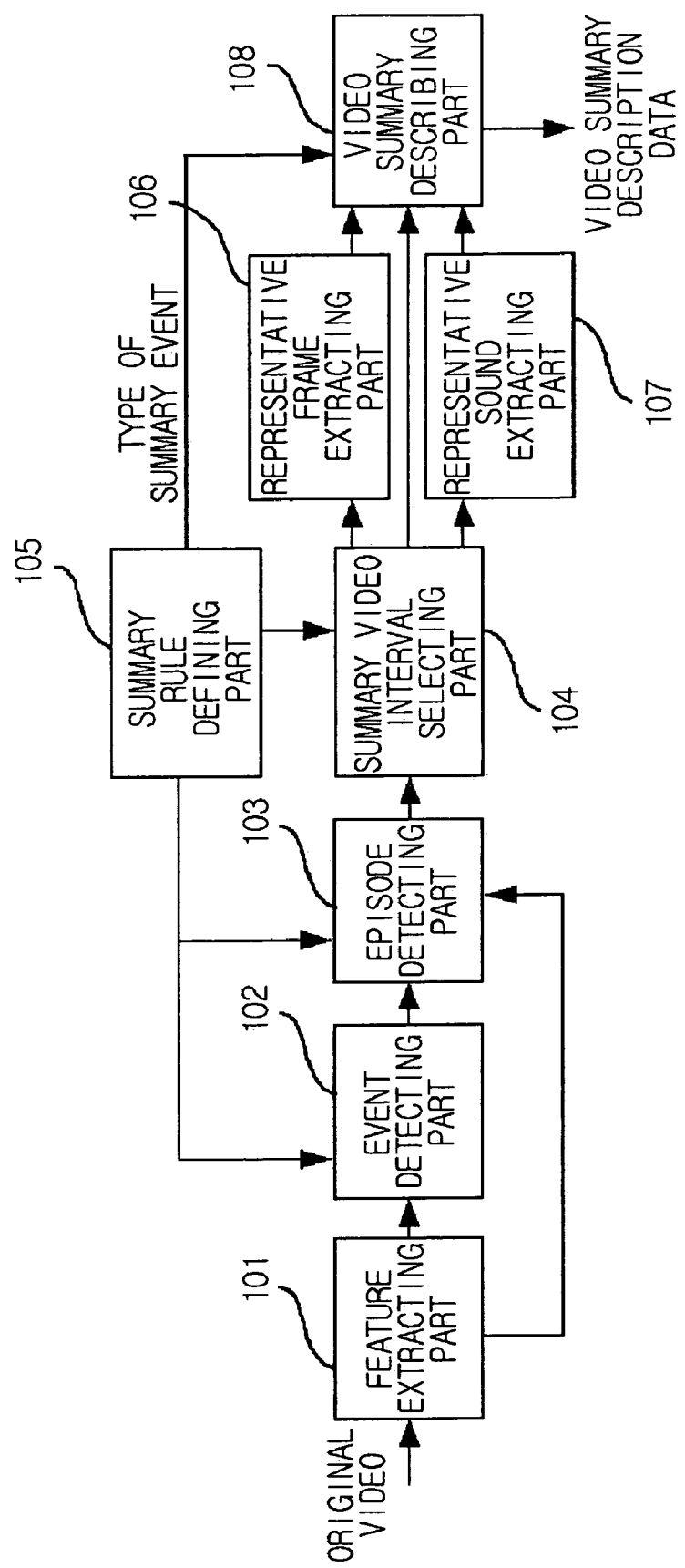
FIG. 1 is a block diagram illustrating a system for generating video summary description data according to the description scheme of the present invention.

The present invention will be described in detail by way of a preferred embodiment with reference to accompanying drawings, in which like reference numerals are used to identify the same or similar parts.

FIG. 1 is a block diagram illustrating a system for generating video summary description data according to the description scheme of the present invention.

As illustrated in FIG. 1, the apparatus for generating video description data according to an embodiment of the present invention is composed of a feature extracting part 101, an event detecting part 102, an episode detecting part 103, a video summary interval selecting part 104, a summary rule defining part 105, a representative frame extracting part 106, a representative sound extracting part 107 and a video summary describing part 108.

The feature extracting part 101 extracts necessary features to generate video summary by inputting the original video. The general features include shot boundary, camera motion, caption region, face region and so on.

In the step of extracting features, the types of features and video time interval at which those features are detected are output to the step of detecting event in the format of (types of features, feature serial number, time interval) by extracting those features.

For example, in the case of camera motion, (camera zoom, 1, 100~150) represents the information that the first zoom of camera was detected in the 100~150 frame.

The event detecting part 102 detects key events that are included in the original video. Because these events must represent the contents of the original video well and are the references for generating video summary. These events are generally differently defined according to genre of the original video.

These events either may represent higher meaning level or may be visual features that can directly infer higher meaning. For example, in the case of soccer video, goal, shoot, caption, replay and so on can be defined as events.

The event detecting part 102 outputs the types of detected events and the time interval in the format of (types of events, event serial number, time interval). For example, the event information indicating that the first goal occurred at between 200 and 300 frame is output in the format of (goal, 1, 200~300).

The episode detecting part 103, on the basis of the detected event, divides the video into an episode with a larger unit than an event based on the story flow. After detecting key events, an episode is detected while including accompanied events that follow the key event. For example, in the case of soccer video, the goal and shoot can be key events and the bench scene, audiences scene, goal ceremony scene, replay of goal scene and so on compose accompanied events of the key events.

That is, the episode is detected on the basis of the goal and shoot.

The episode detection information is output in the format of (episode number, time interval, priority, feature shot, associated event information). Herein, the episode number is a serial number of the episode and the time interval represents the time interval of the episode by the shot unit. The priority represents the degree of importance of the episode.

The feature shot represents the shot number including the most important information out of the shots comprising the episode and the associated event information represents the event number of the event related to the episode. For example, in the case of representing the episode detection information as (episode 1, 4~6, 1, 5, goal: 1, caption 3), the information means that the first episode includes 4~6th shot, the priority is the highest (1), the feature shot is the fifth shot, and the associated events are the first goal and the third caption.

The video summary interval selecting part 104 selects the video interval at which the contents of the original video can be summarized well on the basis of the detected episode. The reference of selecting the interval is performed by the predefined summary rule of the summary rule defining part 105.

The summary rule defining part 105 defines rule for selecting the summary interval and outputs control signal for selecting the summary interval. The summary rule defining part 105 also outputs the types of summary events, which are bases in selecting the video summary interval, to the video summary describing part 108.

The video summary interval selecting part 104 outputs the time information of the selected video summary intervals by frame units and outputs the types of events corresponding to the video intervals. That is, the format of (100~200, goal), (500~700. shoot) and so on represent that the video segments selected as the video summary intervals are 100~200 frame, 500~700 frame and so on and the event of each segment is goal and shoot respectively. As well, the information such as file name can be output to facilitate the access of an additional video, which is composed of only the video summary interval.

If the video summary interval selection is completed, the representative frame and the representative sound are extracted from the representative frame extracting part 106 and the representative sound extracting part 107 respectively by using the video summary interval information.

The representative frame extracting part 106 outputs the image frame number representing the video summary interval or outputs the image data.

The representative sound extracting part 107 outputs the sound data representing the video summary interval or outputs the sound time interval.

Figure 2:
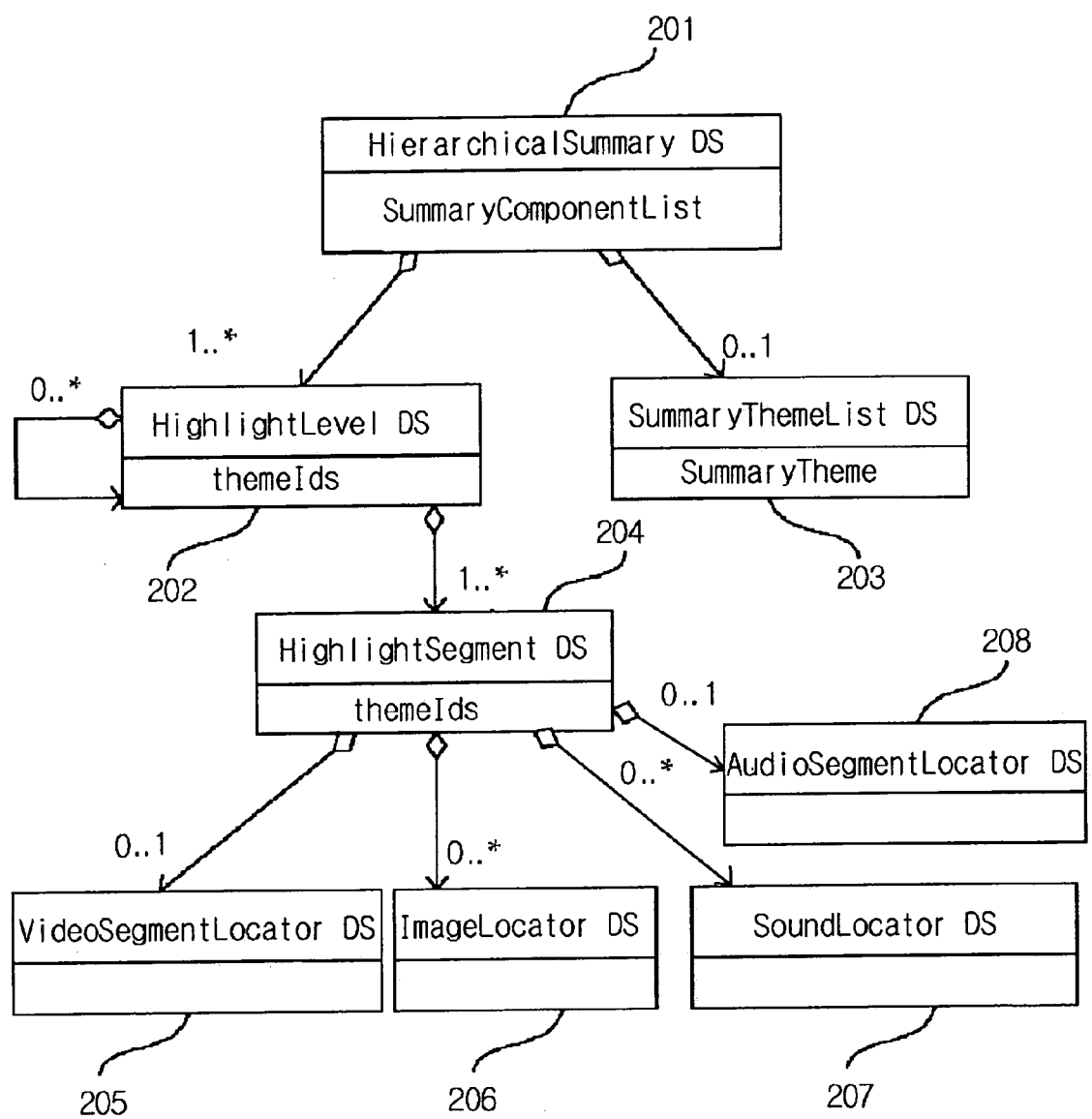
FIG. 2 is a drawing that illustrates the data structure of the HierarchicalSummary DS describing the video summary description scheme according to the present invention in UML (Unified Modeling Language).

The video summary describing part 108 describes the related information in order to make efficient summary and browsing functionalities to be feasible according to the Hierarchical Summary Description Scheme of the present invention shown in FIG. 2.

The main information of the Hierarchical Summary Description Scheme comprises the types of summary events of the video summary, the time information describing each video summary interval, the representative frame, the representative sound, and the event types in each interval.

The video summary describing part 108 outputs the video summary description data according to the description scheme illustrated in FIG. 2.

FIG. 2 is a drawing that illustrates the data structure of the HierarchicalSummary DS describing the video summary description scheme according to the present invention in UML (Unified Modeling Language).

The HierarchicalSummary DS 201 describing the video summary is composed of one or more HighlightLevel DS 202 and one or zero SummaryThemeList DS 203.

The SummaryThemeList DS provides the functionality of the event based summary and browsing by enumeratively describing the information of subject or event constituting the summary. The HighlightLevel DS 202 is composed of the HighlightSegment DSs 204 as many as the number of the video intervals constituting the video summary of that level and zero or several number of HighlightLevel DS.

The HighlightSegment DS describes the information corresponding to the interval of each video summary. The HighlightSegment DS is composed of one VideoSegmentLocator DS 205, zero or several ImageLocator DSs 206, zero or several SoundLocator DSs 207 and AudioSegmentLocator 208.

The following give more detailed description about the HierarchicalSummary DS.

The HierarchicalSummary DS has an attribute of SummaryComponentList, which obviously represents the summary type and which is comprised of the HierarchicalSummary DS.

The SummaryComponentList is derived on the basis of the SummaryComponentType and describes by enumerating all comprised SummaryComponentTypes.

In the SummaryComponentList, there are five types, such as keyFrames, keyVideoClips, keyAudioClips, keyEvents, and unconstraint.

The keyFrames represents the key frame summary composed of representative frames. The keyVideoClips represents the key video clip summary composed of key video intervals' sets. The keyEvents represents the summary composed of the video interval corresponding to either the event or the subject. The keyAudioClips represents the key audio clip summary composed of representative audio intervals' sets. And, the unconstraint represents the types of summary defined by users except for the summaries.

Also, in order to describe the event-based summary, the HierarchicalSummary DS might comprise the SummaryThemeList DS which is enumerating the event (or subject) comprised in the summary and describing the ID.

The SummaryThemeList has arbitrary number of SummaryThemes as elements. The SummaryTheme has an attribute of id of ID type and selectively has an attribute of parentId.

The SummaryThemeList DS permits the users browsing the video summary from the viewpoint of each event or several subjects described in the SummaryThemeList. That is, the application tool inputting description data makes the user select the desired subject by parsing the SummaryThemeList DS and providing the information to the user.

At this time, in the case of enumerating these subjects into simple format, if the number of the subjects is large, it might not be easy to find out the subject desired by the users.

Accordingly, by representing the subject as a tree structure similar to ToC (Table of Content), the users efficiently can do browsing at each subject after finding out the desired subject.

In order to do so, the embodiments of the present invention permit the attribute of parentId being selectively used in the SummaryTheme. The parentId means the upper element (upper subject) in the tree structure.

The HierarchicalSummary DS of the present invention comprises HighlightLevel DSs, and each HighlightLevel DS comprises one or more HighlightSegment DS, which corresponds to a video segment (or interval) constituting the video summary.

The HighlightLevel DS has an attribute of themeIds of IDREFS type.

The themeIds describes the subject and event id, common to the children HighlightLevel DS of corresponding HighlightLevel DS or all HighlightSegment DSs comprised in the HighlightLevel, and the id is described in the SummaryThemeList DS.

The themeIds can denote several events and, when doing event based summary, solve the problem that same id is unnecessarily repeated in all segments constituting the level by having the themeIds representing common subject type in the HighlightSegment constituting the level.

The HighlightSegment DS comprises one VideoSegmentLocator DS and one or more ImageLocator DS, zero or one SoundLocator DS and zero or one AudioSegmentLocator DS.

Herein, the VideoSegmentLocator DS describes the time information or video itself of the video segment constituting the video summary. The ImageLocator DS describes the image data information of the representative frame of the video segment. The SoundLocator DS describes the sound information representing the corresponding video segment interval. The AudioSegmentLocator DS describes the interval time information of the audio segment constituting the audio summary or the audio information itself.

The HighlightSegment DS has an attribute of themeIds. The themeIds describes using the id defined in the SummaryThemeList which subjects or events described in the SummaryThemeList DS relates to the corresponding highlight segment.

The themeIds can denote more than one event, and by allowing one highlight segment to have several subjects, it is an efficient technique of the present invention which is solving the problem of indispensable duplication of descriptions caused by describing the video segment at each event (or subject) when using the existing method for event-based summary.

When describing the highlight segment constituting the video summary, in a different way from the existing hierarchical summary description scheme describing only the time information of the highlight video interval, in order to describe the video interval information of each highlight segment, the representative frame information and the representative sound information, by placing the VideoSegmentLocator DS, the ImageSegmentLocator DS and the SoundLocator DS, the present invention makes the overview through the highlight segment video and the navigation and browsing utilizing the representative frame and the representative sound of the segment to be feasible to efficiently utilize through the introduction of the HighlightSegment DS for describing the highlight segment constituting the video summary.

By placing the SoundLocator DS capable of describing the representative sound corresponding to the video interval, in real instances through the characteristic sound capable of representing the video interval, for example gun shot, outcry, anchor's comment in soccer (for example, goal and shoot), actors' name in drama, specific word, etc., it is possible to do efficient browsing by roughly understanding whether the interval is an important interval containing the desired contents or what contents are contained in the interval within a short time without playing the video interval.

Figure 3:
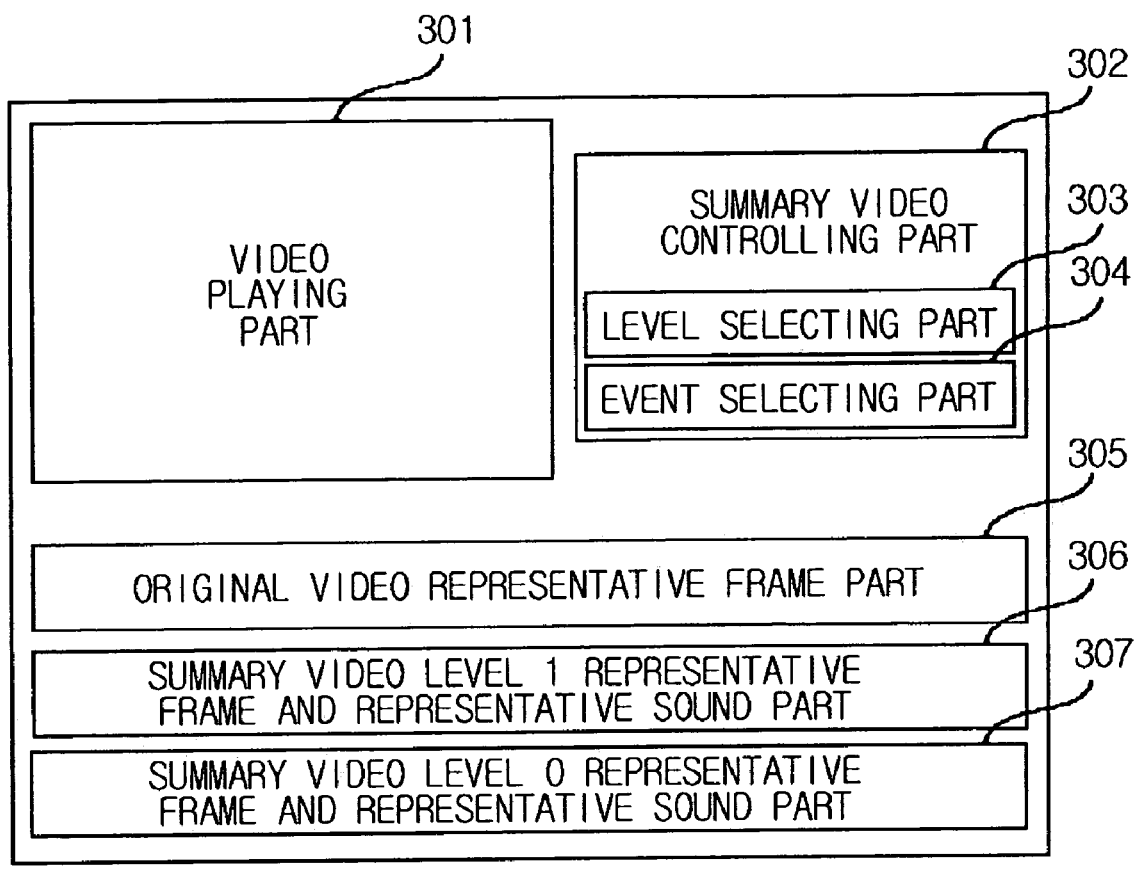
FIG. 3 is a compositional drawing of a user interface of the tool for playing and browsing of the video summary inputting the video summary description data described by the same description scheme as FIG. 2.

FIG. 3 is a compositional drawing of a user interface of the tool for playing and browsing of the video summary inputting the video summary description data described by the same description scheme as FIG. 2.

The video playing part 301 plays the original video or the video summary according to the control of the user. The original video representative frame part 305 shows the representative frames of the original video shots. That is, it is composed of a series of images with reduced sizes.

The representative frame of the original video shot is described not by the HierarchicalSummary DS of the present invention but by additional description scheme and can be utilized when both the description data are provided along with the summary description data described by the HierarchicalSummary DS of the present invention.

The user accesses to the original video shot corresponding to the representative frame by clicking the representative frame.

The video summary level 0 representative frame part and the representative sound part 307 and the video summary level 1 representative frame part and the representative sound part 306 shows the frame and sound information representing each video interval of the video summary level 0 and the video summary level 1 respectively. That is, it is composed of the iconic images representing a series of the images and sounds with reduced sizes.

If the user clicks the representative frame of the video summary representative frame part and the representative sound part, the user accesses to the original video interval corresponding to the representative frame. Herein, in the case of clicking the representative sound icon corresponding to the representative frame of the video summary, the representative sound of the video interval is played.

The video summary controlling part 302 inputs the control for user selection to play the video summary. In the case of being provided with the multi-level video summary, the user does overview and browsing by selecting the summary of the desired level through the level selecting part 303. The event selecting part 304 enumerates the event and the subject provided by the SummaryThemeList and the user does overview and browsing by selecting the desired event. After all, this realizes the summary of the user customization type.

Figure 4:
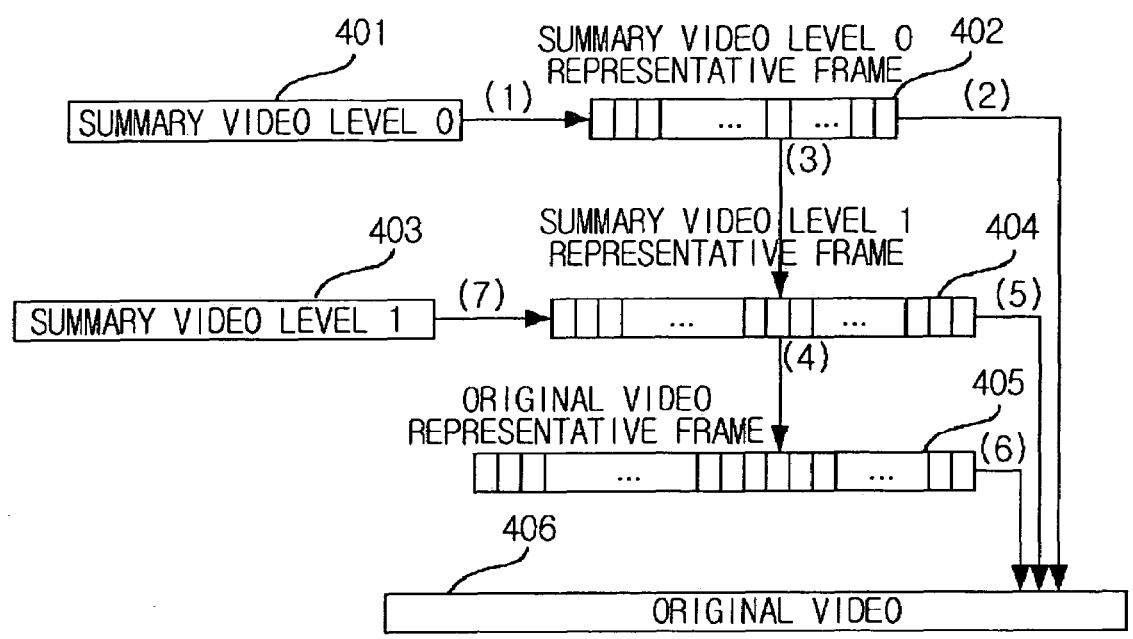
FIG. 4 is a compositional drawing for the flow of the data and control for hierarchical browsing using the video summary of the present invention.

FIG. 4 is a compositional drawing for the flow of the data and control for hierarchical browsing using the video summary of the present invention.

The browsing is performed by accessing the data for browsing with the method of FIG. 4 through the use of the user interface of FIG. 3. The data for browsing are the video summary and the representative frame of the video summary and the original video 406 and the original video representative frame 405.

The video summary is assumed to have two levels. Needless to say, the video summary may have more levels than two. The video summary level 0 401 is what is summarized with shorter time than the video summary level 1 403. That is, the video summary level 1 contains more contents than the video summary level 0. The video summary level 0 representative frame 402 is the representative frame of the video summary level 0 and the video summary level 1 representative frame 404 is the representative frame of the video summary level 1.

The video summary and the original video are played through the video playing part 301 shown in FIG. 3. The video summary level 0 representative frame is displayed in the video summary level 0 representative frame and the representative sound part 306, the video summary level 1 representative frame is displayed in the video summary level 1 representative frame and the representative sound part 307, and the original video representative frame is displayed in the original video representative frame part 305.

The hierarchical browsing method illustrated in FIG. 4 can have various types of hierarchical paths as the following example.

Case 1: (1)-(2)
Case 2: (1)-(3)-(5)

Case 3 (1)-(3)-(4)-(6)
Case 4: (7)-(5)
Case 5: (7)-(4)-(6)

The overall browsing scheme is as follows.

First, understand the overall contents of the original video by watching the video summary of the original video. Herein, the video summary may play either the video summary level 0 or the video summary level 1. When more detailed browsing is wanted after watching the video summary, the interested video interval is identified through the video summary representative frame. If the scene which is desired to be exactly found, is identified in the video summary representative frame, play it by directly accessing to the video interval of the original video to which the representative frame is connected. And if the more detailed information is needed, the user may access the desired original video either by understanding the representative frame of the next level or by hierarchically understanding the contents of the representative frame of the original video.

Although these hierarchical browsing techniques might take a long time in browsing to access the desired contents while the original video is being played, the browsing time is substantially reduced by directly accessing the contents of the original video through the hierarchical representative frame.

The existing general video indexing and browsing techniques divide the original video in shot unit and access to the shot by perceiving the desired shot from the representative frame after constituting the representative frame representing each shot.

In this case, because the number of shots in the original video is large, substantial time and efforts are necessary to do browsing the desired contents out of many representative frames.

In the present invention, it is feasible to quickly access the desired video by constituting the hierarchical representative frame with the representative frame of the video summary.

The case 1 is the case that plays the video summary level 0 and directly accesses to the original video from the video summary level 0 representative frame.

The case 2 is the case that plays the video summary level 0 and selects the most interested representative frame from the video summary level 0 representative frame and identifies the desired scene in the video summary level 1 representative frame corresponding to the neighborhood of the representative frame to understand more detailed information before access to the original video and then accesses to the original video.

The case 3 is the case that selects the most interested representative frame to obtain more detailed information in the case that the access from the video summary level 1 representative frame to the original video is difficult in the case 2 and by the original video representative frames neighboring the representative frame identifies the desired scene and then accesses to the original video using the representative frame of the original frame.

The case 4 and case 5 are the cases that start at the playing of the video summary level 1 and the paths are similar to the above cases.

When applied to the server/client circumstance, the present invention can provide a system in which multiple clients can access one server and do video overview and browsing. The original video is inputted to the server and the video summary description data is produced on the basis of the hierarchical summary description scheme and the video summary description data generation system linking the original video and the video summary description data is equipped. The client accesses the server through the communication network, does overview of the video using the video summary description data, and does browsing and navigation of the video by accessing to the original video.

Although, the present invention was described on the basis of preferably executable examples, these executable examples do not limit the present invention but exemplify. Also, it will be appreciated by those skilled in the art that changes and variations in the embodiments herein can be made without departing from the spirit and scope of the present invention as defined by the following claims and the equivalents thereof.

What we claim:

1. A HierarchicalSummary Description Scheme (DS) for describing a video summary, the HierarchicalSummary DS comprising: a HighlightLevel DS includes at least one HighlightSegment DS, the HighlightSegment DS configured to describe information on a highlight segment corresponding to one of a plurality of video summary intervals, the HighlightSegment DS further including a VideoSegmentLocator DS describing time information or a video itself of the highlight segment and an ImageLocator DS describing a representative frame of the highlight segment.

2. The HierarchicalSummary DS of claim 1 wherein said HighlightLevel DS further comprises at least one lower level HighlightLevel DS.

3. The HierarchicalSummary DS of claim 1 wherein said HighlightSegment DS further comprises a SoundLocator DS that describes the representative sound information of said corresponding highlight segment.

4. The HierarchicalSummary DS of claim 1 wherein said HighlightSegment DS further comprises an AudioSegmentLocator DS that describes the audio segment information constituting an audio summary of said corresponding highlight segment.

5. The HierarchicalSummary DS of claim 4 wherein the HierarchicalSummary DS includes an attribute of a SummaryComponentList that describes and enumerates SummaryComponentTypes representing types of summary.

6. The HierarchicalSummary DS of claim 5 wherein said SummaryComponentType comprises keyFrames representing a key frame summary composed of representative frames, keyVideoClips representing a key video clip summary composed of key video segment' sets, keyEvents representing a summary of a video interval corresponding to either an event or a subject, and keyAudioClips representing a key audio clip summary composed of representative audio intervals' sets, and an unconstraint representing the type of summary defined by users except for said summaries.

7. The HierarchicalSummary DS of claim 1 wherein the HierarchicalSummary DS further includes a SummaryThemeList DS enumerating the event or subject comprised in the summary and enabling users to execute summarizing and browsing based on the event.

8. The HierarchicalSummary DS of claim 7 wherein the SummaryThemeList DS comprises an arbitrary number of SummaryThemes as elements, and the SummaryTheme includes an attribute of and ID representing a corresponding event or subject.

9. The HierarchicalSummary DS of claim 8 wherein the SummaryTheme further includes an attribute of parentID that describes the ID of the event or subject of the upper level.

10. The HierarchicalSummary DS of claim 8 wherein the HighlightLevel DS comprises an attribute of themeIDs describing an attribute of the ID, when the HighlightSegments or HighlightLevels that constitute a corresponding highlight level have common events or subjects, the ID of the common events or the subjects is described in the themeID.

11. The HierarchicalSummary DS of claim 8 wherein the HighlightSegment DS comprises an attribute of themeIDs describing the event or subject of the highlight segment using the attribute of ID described in the SummaryThemeList DS.

12. A computer-readable recording medium where a HierarchicalSummary DS for describing a video summary is stored therein, wherein the HierarchicalSummary DS comprises a HighlightLevel DS that comprises at least one HighlightSegment DS,the HighlightSegment DS describes information on a highlight segment corresponding to one of a plurality of video summary intervals, and the HighlightSegment DS further comprises a VideoSegmentLocator DS describing time information or a video itself of the highlight segment and an ImageLocator DS describing a representative frame of the highlight segment.

13. A method for generating video summary description data according to a video summary description scheme by inputting original video, comprising:
(a) analyzing the input original video and producing video analysis result;
(b) a summary rule for selecting the video summary interval;
(c) selecting the video summary interval capable of summarizing video contents from the original video based on the original video analysis result and the summary rule and constituting video summary interval information;
(d) extracting a representative frame based on the video summary interval information; and
(e) generating video summary description data according to the HierarchicalSummary DS enabling execution of hierarchical browsing based on the video summary interval information and the representative frame,
wherein the HeirarchicalSummary DS comprises a HighlightLevel DS that comprises at least one HighlightSegment DS, and the HighlightSegment DS describes information on a highlight segment corresponding to one of a plurality of video summary intervals, and the HighlightSegment DS comprises a VideoSegmentLocator DS describing time information or a video itself of the highlight segment.

14. The method of claim 13 wherein step (a) comprises the steps of:
extracting features from the input original video and outputting the types of features and video time interval at which those features are detected;
detecting key events included in the original video based on the types of features and video time interval at which those features are detected; and
detecting episode by dividing the original video into story flow on the basis of the detected event.

15. The method of claim 13 wherein the step (d) comprises the step of extracting a representative sound from the video summary interval information.

16. The method of claim 13 wherein the HighlightSegment DS further comprises an ImageLocator DS describing a representative frame of the highlight segment.

17. The method of claim 13 wherein the HighlightSegment DS further comprises SoundLocator DS describing a representative sound information of the highlight segment.

18. The method of claim 13 wherein the HighlightSegment DS further comprises AudioSegmentLocator DS describing the audio segment information constituting an audio summary of the highlight segment.

19. The method of claim 13 wherein the HierarchicalSummary DS further includes SummaryThemeList DS enumerating the event or subject comprised in the summary and enabling user's to execute summarizing and browsing based on the event.

20. The method of claim 18 wherein the SummaryThemeList DS includes arbitrary number of SummaryThemes as elements, and the SummaryTheme includes an attribute of ID representing the corresponding event or subject.

21. The method of claim 20 wherein the HighlightSegment DS includes an attribute of themeIDs describing the event or subject of the highlight segment using the attribute of ID described in the SummaryThemeList DS.

22. The method of claim 20 wherein the SummaryTheme further includes an attribute of parentID describing the ID of the event or subject of the upper level.

23. The method of 20 wherein the HighlightLevel DS includes an attribute of themeIDs describing attribute of the ID, when the HighlightSegments or HighlightLevels which are constituting corresponding highlight level have common events or subjects, the ID of the common events or the subjects is described in the themeID.

24. A system for generating video summary description data according to a video summary description scheme by inputting original video, comprising:
video analyzing means for analyzing the original video and producing video analysis result;
summary rule defining means for defining the summary rule for selecting the video summary interval;
video summary interval selecting means for selecting the video interval capable of summarizing the video contents of the original video and outputting video summary interval information based on the video analysis result from the video analyzing means and the summary rule from the summary rule defining means;
representative frame extracting means for outputting a representative frame representing video summary interval based on the video summary interval information from the video summary interval selecting means; and
video summary describing means for generating video summary description data with HierarchicalSummary DS by inputting the video summary interval information from the video summary interval selecting means and the representative frame information from the representative frame extracting means,
wherein the HierarchicalSummary DS comprises a HighlightLevel DS that comprises at least one HighlightSegment DS, and the HighlightSegment DS describes information on segment information corresponding to one of a plurality of video summary intervals, and the HighlightSegment DS comprises a VideoSegmentLocator DS describing time information or a video itself of the highlight segment and an ImageLocator DS describing a representative frame of the highlight segment, the HierarchicalSummary DS providing direct access to content of the original video through the representative frame information.

25. The system of claim 24 wherein said video analyzing means comprises:
feature extracting means for extracting features from the original video and producing the types of features and video time interval at which those features are detected;

event detecting means for detecting key events included in the original video by inputting the types of features and video time interval at which those features are detected; and episode detecting means for detecting episode by dividing the original video into story flow base on the basis of said detected event.

26. The system of claim 24, the system further comprises representative sound extracting means for extracting a representative sound by inputting the video summary interval information and providing the extracted representative sound to the video summary describing means.

27. The system of claim 24 wherein the HighlightSegment DS further comprises SoundLocator DS describing a representative sound information of the highlight segment.

28. The system of claim 24 wherein the HighlightSegment DS further comprises AudioSegmentLocator DS describing the audio segment information constituting an audio summary of the highlight segment.

29. The system of claim 24 wherein the HierarchicalSummary DS further includes SummaryThemeList DS enumerating the event or subject comprised in the summary and enabling user's to execute summarizing and browsing based on the event.

30. An apparatus for browsing video summary description data, wherein the video summary description data has a HierarchicalSummary Description Scheme (DS) for describing a video summary from an original video, the HierarchicalSummary DS includes: a HighlightLevel DS which comprises at least one HighlightSegment DS describing information on highlight segment corresponding one of video summary intervals, and a SummaryThemeList DS enumerating the event or subject comprised in the summary and enabling user's to execute summarizing and browsing based on the event, wherein the HighlightSegment DS includes a VideoSegmentLocator DS describing time information or video itself of the highlight segment, and an ImageLocator DS describing a representative frame of the highlight segment, wherein the browsing apparatus comprising:

a video playing part for playing an original video or the video summary;

an original video representative frame part for playing a representative frame of the original video;

a first video summary representative frame part for playing a first summary level of video interval, a second video summary representative frame part for playing a second summary level of video interval, wherein the second summary level is summarized more finely than the first summary level;

a level selecting part for selecting the first summary level or the second summary level thereby enabling the video playing part to play the selected summary level; and an event selecting part for enumerating the event or the subject provided in the SummaryThemeList DS for a user to browse desired event; and a direct access part to provide direct access to the contents of the original video through the original video representative frame part when playing the first summary level of video interval or the second summary level of video interval.

31. The apparatus of claim 30 wherein the first video summary representative frame part plays the first summary level of sound information, and the second video summary representative frame part plays the first summary level of sound information.

32. The apparatus of claim 31 wherein the HighlightSegment DS further comprises:

a SoundLocator DS describing a representative sound information of the highlight segment; and an AudioSegmentLocator DS describing the audio segment information constituting an audio summary of the highlight segment.

33. A method of browsing video summary description data, and accessing original video, the video summary description data having a HierarchicalSummary Description Scheme (DS) for describing a video summary, the HierarchicalSummary DS having a HighlightLevel DS which comprises at least one HighlightSegment DS describing information on highlight segment corresponding one of video summary intervals, and the HighlightSegment DS having a VideoSegmentLocator DS describing time information or video itself of the highlight segment, and an ImageLocator DS describing a representative frame of the highlight segment, the browsing method comprising:

(a) playing a first summary level of video summary;

(b) playing a video interval of the original video corresponding to the representative frame when a desired scene is found through the video summary representative frame at the step (a); and (c) directly accessing the original video through the video summary representative frame when playing the first summary level of video summary or when playing the video interval of the original video corresponding to the representative frame.

34. The method of claim 33, further comprising:

(c) playing a second summary level of video summary when a desired scene is not found through the video summary representative frame at the step (a), wherein the second summary level is summarized more finely than the first summary level.

35. The method of claim 33 wherein the HighlightSegment DS further comprises a SoundLocator DS describing a representative sound information of the highlight segment, the step (b) comprising the step of recognizing the desired scene to be found at the step (a) through the video summary representative sound information.

36. The method of claim 33 wherein the HierarchicalSummary DS further includes SummaryThemeList DS enumerating the event or subject comprised in the summary and enabling user's to execute summarizing and browsing based on the event.

37. A Video Summary Description Scheme (DS) for describing a video summary of an original video, comprising:

at least one HighlightSegment DS describing information on a highlight segment corresponding to at least one video summary interval, wherein the HighlightSegment DS comprises a VideoSegmentLocator DS describing time information or video itself of the highlight segment and an ImageLocator DS describing a representative frame of the highlight segment; the HighlightSegment DS providing direct access to the original video throught the representative frame.

38. The Video Summary DS of claim 37 wherein the HighlightSegment DS further comprises SoundLocator DS describing a representative sound information of the highlight segment.

39. The Video Summary DS of claim 37 wherein the HighlightSegment DS further comprises AudioSegmentLocator DS describing the audio segment information constituting an audio summary of the highlight segment.

40. A method of browsing video summary description data of an original video, the video summary description data having at least one HighlightSegment DS describing information on a highlight segment corresponding to one of a plurality of video summary intervals, the HighlightSegment DS including a VideoSegmentLocator DS describing time information or video itself of the highlight segment and an ImageLocator DS describing a representative frame of the highlight segment, the browsing method comprising:

(a) playing a first summary level of the video summary;

(b) playing a video interval of the original video corresponding to the representative frame when a desired scene is found through the video summary representative frame at the step (a); and (c) directly accessing the contents of the original video when playing the first summary level of the video summary or playing the video interval of the original video.

41. The method of claim 40 further comprising:

(c) playing a second summary level of video summary when a desired scene is not found through the video summary representative frame at the step (a), wherein the second summary level is summarized more finely than the first summary level.

42. The method of claim 40 wherein the HighlightSegment DS further comprises a SoundLocator DS describing a representative sound information of the highlight segment, the step (b) comprising the step of recognizing the desired scene to be found at the step (a) through the video summary representative sound information.

43. The method of claim 40, wherein directly accessing comprises directly accessing the contents of the original video through the representive frame.

* * * * *